United States Patent [19]

Hawley

[11] Patent Number: 5,523,868
[45] Date of Patent: Jun. 4, 1996

[54] APPARATUS AND METHOD FOR MONITORING POWER LOSS IN A TELECOMMUNICATIONS SYSTEM

[75] Inventor: George T. Hawley, Santa Clara, Calif.

[73] Assignee: DSC Communications Corporation, Plano, Tex.

[21] Appl. No.: 322,388

[22] Filed: Oct. 12, 1994

Related U.S. Application Data

[63] Continuation of Ser. No. 102,109, Aug. 3, 1993, abandoned, which is a continuation of Ser. No. 812,073, Dec. 19, 1991, abandoned.

[51] Int. Cl.$^6$ .................................................. H04B 10/08
[52] U.S. Cl. ........................... 359/110; 359/177; 359/171
[58] Field of Search .................................... 359/110, 118, 359/119, 120, 121, 161, 174, 173, 175, 177, 171; 455/38.3, 52.1, 52.2, 53.2; 307/64, 65, 66

[56] References Cited

U.S. PATENT DOCUMENTS

| | | | |
|---|---|---|---|
| 3,651,471 | 3/1972 | Haselwood et al. | 340/172.5 |
| 4,249,166 | 2/1981 | Schultz | 340/506 |
| 4,313,224 | 6/1982 | Wakabayashi et al. | 359/110 |
| 4,403,139 | 9/1983 | De Loach, Jr. | 250/205 |
| 4,449,247 | 4/1984 | Waschka, Jr. | 359/177 |
| 4,506,356 | 3/1985 | Krull | 370/1 |
| 4,531,240 | 7/1985 | Yokomizo | 455/607 |
| 4,541,044 | 9/1985 | Shibata | 364/200 |
| 4,567,586 | 1/1986 | Koeck | 370/4 |
| 4,581,770 | 4/1986 | Haworth | 455/601 |
| 4,728,808 | 3/1988 | Bet-Esh et al. | 307/66 |
| 4,841,474 | 6/1989 | Zandveld et al. | 307/66 |
| 4,887,290 | 12/1989 | Dop et al. | |
| 5,012,121 | 4/1991 | Hammond et al. | 307/64 |
| 5,054,050 | 10/1991 | Burke et al. | 379/27 |
| 5,086,235 | 2/1992 | Marquet et al. | 307/64 |
| 5,136,281 | 8/1992 | Bonaquist | 379/42 |
| 5,150,243 | 9/1992 | Suzaki | 359/110 |

FOREIGN PATENT DOCUMENTS

| | | | |
|---|---|---|---|
| 0149154 | 2/1982 | Japan | H04B 3/44 |
| 0149155 | 2/1982 | Japan | H04B 3/44 |
| 0204649 | 3/1984 | Japan | H04B 3/44 |
| 0230729 | 4/1986 | Japan | H04B 3/44 |
| 0057838 | 3/1989 | Japan | 357/110 |
| 2-2749 | 1/1990 | Japan. | |

OTHER PUBLICATIONS

Pagetex (monitoring and control experts), Advertisement Mobile Radio Technology Jun. 1991.
9th International Telecommunications Energy Conference Intelec 87, No. 14–5, 14 Jun. 1987, Stockholm, Sweden, pp. 601–606.
G. Musil et al. "A Flexible, Modular Power–Feeding System For Digital Optical Waveguide Transmission".

*Primary Examiner*—Leo Boudreau
*Assistant Examiner*—Rafael Bacares
*Attorney, Agent, or Firm*—Baker & Botts

[57] ABSTRACT

A method and apparatus are provided for monitoring power loss in a telecommunications system. Power is received from a permanent power source. A loss of power from the permanent power source is detected. Responsive to the detection of loss of power, a message indicative of a power failure is transmitted at least once on an optical fiber, the message transmission being powered by a temporary power source.

22 Claims, 1 Drawing Sheet

APPARATUS AND METHOD FOR MONITORING POWER LOSS IN A TELECOMMUNICATIONS SYSTEM

CROSS REFERENCE TO RELATED APPLICATIONS

This application is a continuation of U.S. application Ser. No. 08/102,109 filed Aug. 3, 1993 by George T. Hawley, entitled "Apparatus and Method for Monitoring Power Loss in a Telecommunications System", now abandoned; which is a continuation of U.S. application Ser. No. 07/812,073 filed Dec. 19, 1991 by George T. Hawley, entitled "Apparatus and Method for Monitoring power loss in a Telecommunications System", now abandoned.

TECHNICAL FIELD OF THE INVENTION

This invention relates in general to telecommunications, and more particular to a method and apparatus for monitoring power loss in a telecommunications system.

BACKGROUND OF THE INVENTION

In recent years, telephone companies have increased the use of optical fibers throughout the telephone system. Optical fibers provide a significant increase in communication bandwidth per cross-sectional area of the cables. Further, optical fibers are much better suited for high speed digital communication than traditional copper wires.

Because of the greater bandwidth efficiency, optical fiber cables have been used to replace the loop "feeder" (high cross-section) cables in the telephone networks. Increasingly, however, the telephone companies are interested in replacing the loop "distribution" cables (end cables between the feeder cables and the customers) in order to provide additional higher bandwidth services than are offered currently. For example, video could be transmitted over optical fibers to a customer's home or place of business.

Unlike the present copper distribution cables, an optical fiber cable cannot conduct electricity for power of the optical network units coupling the distribution cable to the customer. Thus, either a copper wire must be cabled in parallel with the optic fiber, or a local power supply (typically derived from the power company) must supply the power.

In either instance, loss of power to the optical network unit ("ONU") that terminates the optical fibers at or near the customer's premises is an occurrence which will result in loss of service. The telephone company preferably may effectively diagnose the problem associated with a loss of service from a remote maintenance center. For effective diagnostics, it is important that the telephone company be able to distinguish a failure of the fiber connected to the optical network unit, failure of the optical network unit itself, and the loss of power in the optical network unit. Moreover, it is important for the telephone company to identify whether a problem originated in the telephone company's own equipment or in the customer's equipment, so that the telephone company may take appropriate actions prior to the dispatching of repair personnel, such as notifying the customer in advance about fees if telephone company repair personnel are dispatched to repair customer-owned equipment.

Thus, a need has arisen for a method and apparatus for monitoring power loss in a telecommunications system, such that the loss of power indication is differentiated from an optical cable or ONU electronic failure in order to facilitate rapid diagnosis and service restoral, and such that a problem originating in the telephone company's own equipment may be differentiated from a problem originating in the customer's equipment.

SUMMARY OF THE INVENTION

In a method and apparatus for monitoring power loss in a telecommunications system, power is received from a permanent power source. A loss of power from the permanent power source is detected. Responsive to the detection of loss of power, a message indicative of a power failure is transmitted at least once on an optical fiber, the message transmission being powered by a temporary power source.

The present invention provides significant technical advantages. The positive indication of a loss of power reduces the uncertainty resulting from an indication of a loss of service. In particular, loss of optical network unit power can be distinguished from loss of optical network unit optical signal. Also, a loss of power in the telephone company's own optical network unit can be distinguished from a problem originating in the customer's equipment. Thus, problems associated with a loss of power may be more quickly and more efficiently determined and repaired.

BRIEF DESCRIPTION

For a more complete understanding of the present invention, and the advantages thereof, reference is now made to the following descriptions taken in conjunction with the accompanying drawings, in which.

Figure 3A:
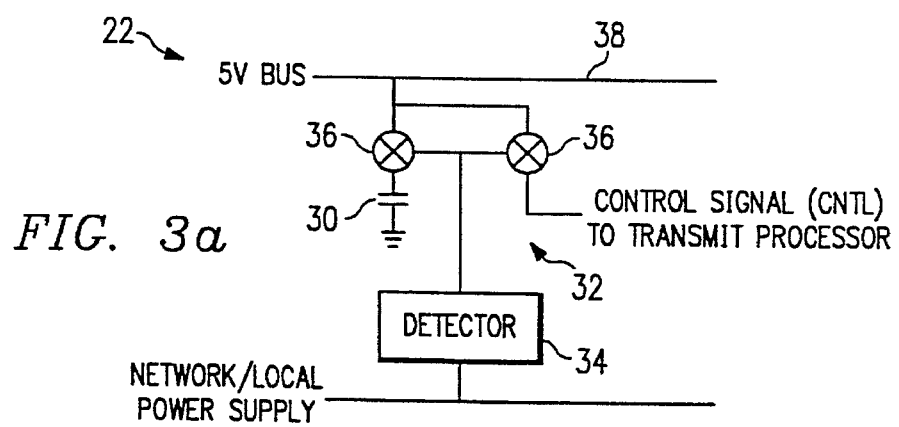
Figure 3B:
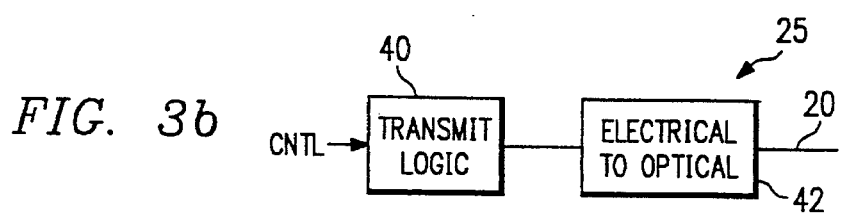

FIGS. 3a–b illustrate a block diagram of power loss detection circuitry.

DETAILED DESCRIPTION OF THE INVENTION

Figure 1:
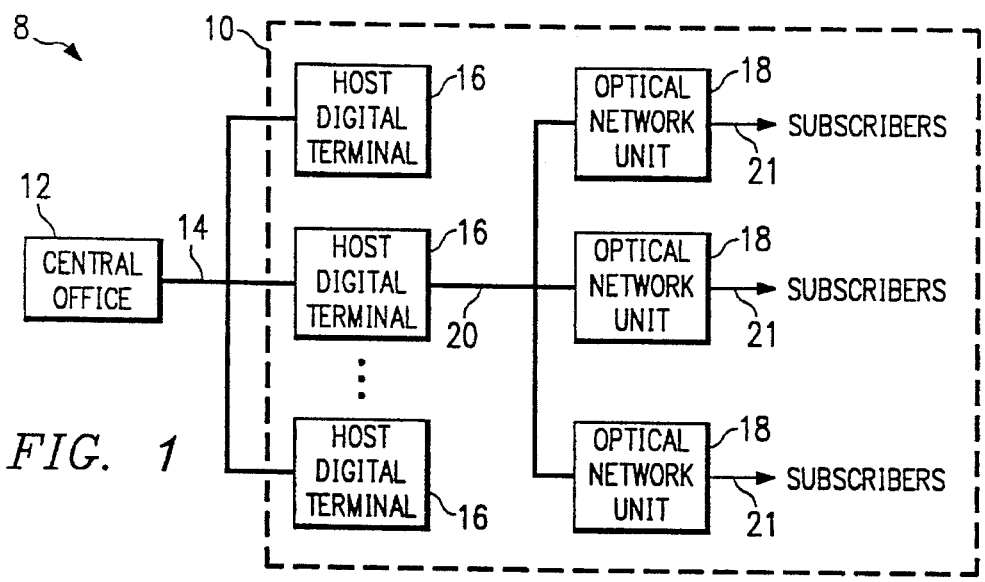
FIG. 1 illustrates a block diagram of an optical fiber telecommunications system.
Figure 2:
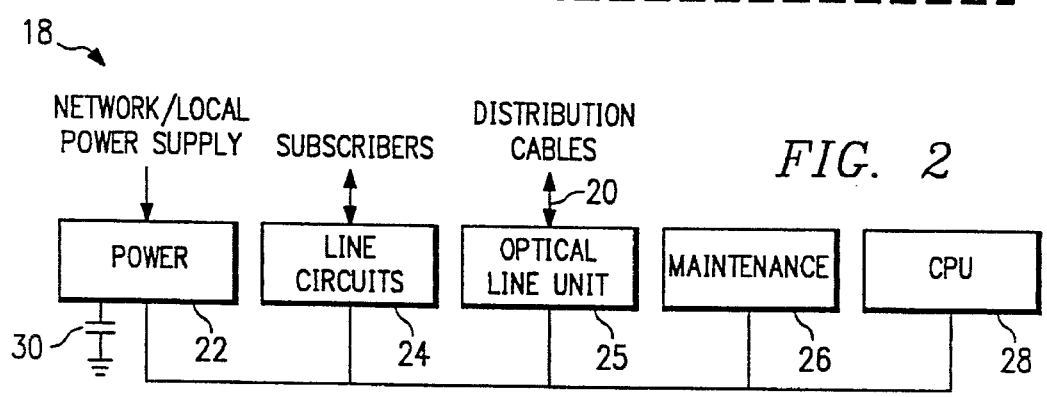
FIG. 2 illustrates a block diagram of an optical outwork unit.

The preferred embodiment of the present invention and its advantages are best understood by referring to FIGS. 1–3 of the drawings, like numerals being used for like and corresponding parts of the various drawings.

FIG. 1 illustrates a block diagram of an optical fiber telecommunications system 8. The loop plant 10 radiates from the central office 12 which terminates feeder cables 14 which are coupled to host digital terminals 16. Each host digital terminal 16 is coupled to a plurality of optical network units 18 via optical fiber distribution cables 20. The optical network units 18 terminate the distribution cables 20 and provide a conversion between optical digital signals and conventional electrical service signals connected to the telecommunications equipment of one or more subscribers over copper drop wires 21. The host digital terminal 16 may alternatively be located in the central office 12, in which case the "feeder" cables 14 are reduced to short electrical or short optical connections to the local digital switch in the central office 12.

In recent years, the feeder cables 14, which were previously composed of a high cross-section copper wire cable, have been replaced by optical fibers which provide a much higher bandwidth per cross-sectional area. The optical cables transmit data in digital form through laser pulses rather than by analog voltage signals. The host digital terminals 16 aggregate services transmitted over distribution cables 20 into efficient, high bandwidth interfaces to central office 12. In order to provide additional services to the subscribers, the telephone companies have begun replacing copper wire with optical fibers. The optical fibers provide an increased bandwidth to the subscribers, for efficient aggregation of conventional services and the transmission of video signals and high-speed computer communication. To translate the signals from the distribution cable 20 into a form which may be accessed by the subscriber, an optical network unit is required. The optical network unit provides three main functions: (1) a multiplexing of multiple service signals, (2) a service interface which transforms optical signals from the distribution cable 20 to electrical signals for the subscriber and which transforms electrical signals from the subscriber to optical signals for the distribution cable, and (3) administration and maintenance circuitry which monitors the operations of the optical network unit and reports on errors or other malfunctions.

If, for example, there is a circuitry failure in one of the optical network units 18, the failure will cause that optical network unit 18 to output a message to the host digital terminal 16 which will relay the message to alarm telemetry equipment in the central office 12 notifying a remote maintenance center concerning which optical network unit has failed and the cause of the failure. However, in the event the failure is caused by a loss of power to the optical network unit, it may be impossible to transmit the error message, since the optical network unit will not have the ability to transmit the failure message to the central office. Moreover, this is the same perceived state that would result from a laser transmitter failure in the optical network unit or from an optical fiber cable cut between the optical network unit and the host digital terminal.

There are two proposed methods of providing power to the optical network unit. The first method is to provide power over copper wires in parallel with the optical fibers from a point distant from optical network unit. This method is sometimes referred to as "network power." Typically, a common battery plant is located at the power source, shared by many optical network units, to provide a power back-up in the event of a power company failure. The other method is to provide a local supply of power, i.e., to access power from the local power company at a point adjacent to the optical network unit. Typically, using this method, batteries are provided in the optical network units 18 to provide a power backup in the event of a power company failure.

When service is lost due to equipment failures on any part of the host digital terminal 16 or optical network unit 18, the telephone company receives an alarm informing it that service has been lost. The alarm could be due to several problems, such as an electronics problem in the host digital terminal 16 or optical network unit 18, a fiber break in the distribution cable 20, a loss of power at the optical network unit 18, or a problem originating in the customer's own equipment. If network power is employed, as soon as the power is lost, the communication ability of the optical network units 18 is lost. If local power is used, the communications ability of the optical network unit will be lost when the batteries wear down. When communication is lost with the failing optical network unit, needed information is lost. Therefore, a remote maintenance center cannot accurately diagnose the problem without dispatching workers to diagnose and identify the problem.

FIG. 2 illustrates a block diagram of an optical network unit 18. The optical network unit 18 comprises power circuitry 22, one or more line circuits 24, optical line unit 25, maintenance circuitry 26, and a CPU 28. The line circuits 24 are coupled to the subscribers' telecommunications jacks, typically over copper wire. The network or local power supply is coupled to the power circuitry 22, as is energy storage device 30, shown as a capacitor.

The power circuitry 22 interfaces with the network/local power to supply DC power to the subscriber telephones, to provide an oscillated power signal to the ringers of the subscriber telephones and to provide ±5 volts to the logic throughout the optical network unit 18. A large capacitor may be provided to supply peak power demand while a plurality of telephones are simultaneously ringing.

The line circuits 24, also known as "channel units", couple the processor 28 with the subscribers. The line circuits 24 perform the translation between the digital signals multiplexed by the optical network unit 18 and the analog signals used by the subscribers' telecommunications equipment. The optical network unit 18 may include a plurality of line circuits 24, each line circuit operable to service several telephone lines or other tariffed telecommunications service lines.

The optical line unit (OLU) 25 provides the interface between the optical network unit 18 and the distribution cable 20. The optical line unit 25 includes circuitry to convert between electrical and optical signals and includes a transmit processor which receives the multiplexed services (voice and data) from the CPU 28 and drives an electrical-to-optical circuit in response thereto. This aspect of the invention is shown in greater detail in connection with FIG. 3b.

The maintenance circuitry 26 performs the maintenance functions required by the optical network unit 18. The maintenance circuitry 26 monitors the operation of the optical network unit 18 and sends signals to the CPU 28 in the event of errors.

The CPU 28 includes a processor, program ROM and RAM. The CPU 28 controls operation of the line circuits 24 and optical line unit 25 and responds to maintenance signals from the maintenance circuitry 26, providing maintenance messages in overhead channels in the multiplexed optical signal from the optical network unit 18 to the host digital terminal 16, indicating the maintenance state of the optical network unit circuits.

The optical network unit 18 functions illustrated in FIG. 2 are similar to several optical network units currently on the market. The present invention, as described in connection with FIGS. 3a–b may be adapted for use with any optical network unit configuration.

FIG. 3a illustrates the power loss detection aspect of the invention. The power loss detection circuitry 32 comprises detector circuitry 34 and switches 36. The detector circuitry 34 and detection switches 36 act as a "deadman's switch" which, in the event of a power loss on the network/local power supply, enables the capacitor 30 or other energy storage device such as a battery to supply power to the optical network unit 18 and to provide for a "dying gasp" transmission of an alarm message specifying pertinent data regarding the power loss. Upon detection of the power loss, detector circuit 34 enables switches 36 to pass power from the capacitor 30 to the 5-volt bus 38 (which powers the logic of the optical network unit 18) and to enable a control signal (CNTL) which is coupled through the logic bus to the line circuit 24. Hence, in response to a power loss, the capacitor 30 will be enabled to provide five volts to the 5-volt bus 38 and to the CNTL line until the capacitor is itself discharged.

FIG. 3b illustrates a portion of the circuitry in the optical line unit 25 which is used to output the dying gasp transmission. The CNTL signal is coupled to transmit logic 40. In response to the CNTL signal transitioning to a 5-volt level, the transmit logic 40 outputs a predetermined message on the distribution lines 20 through the electrical-to-optical converter 42. In the preferred embodiment, the message is repeated until the capacitor 30 is discharged.

When power resumes, the capacitor 30 is recharged. The capacitor 30 may be the same capacitor as is used for providing overflow power to the telephone ringers, or may be a separate capacitor or other energy storage device.

While the invention has been described with the CNTL signal providing an interrupt to the transmit logic 40 of the optical line unit 25, the CNTL signal could similarly interrupt the CPU 28 to generate the alarm message to the host digital terminal 16.

The invention provides significant advantages over the prior art. The invention may be adapted to current designs to provide reliable power loss detection and reporting without significant modification to the current designs. The additional circuitry for implementing the power loss detection is relatively inexpensive.

Although the present invention and its advantages have been described in detail, it should be understood that various changes, substitutions and alterations can be made herein without departing from the spirit and scope of the invention as defined by the appended claims.

What is claimed is:

1. Apparatus for monitoring power loss in a remote optical network unit in a telecommunications system, said optical network unit being coupled to a permanent power source, the apparatus comprising:

power circuitry for receiving power from the permanent power source;

detection circuitry coupled to said power circuitry for detecting a loss of said power received by said power circuitry;

fiber optic output circuitry coupled to said power circuitry for receiving said power in order to output telecommunication signals on an optical fiber, said fiber optic output circuitry transmitting on said optical fiber a message indicative of a shutdown of said fiber optic output circuitry due to a power failure in response to said loss of said power to said fiber optic output circuitry detected by said detection circuitry; and a temporary power source coupled to said fiber optic output circuitry for temporarily powering said fiber optic output circuitry for a dying gasp transmission of said message in response to said loss of said power detected by said detection circuitry, said temporary power source having sufficient temporary power to enable said message to be transmitted at least once by said fiber optic output circuitry.

2. The apparatus of claim 1 wherein said fiber optic output circuitry includes circuitry for receiving a control signal from said detection circuity.

3. The apparatus of claim 1 wherein said detection circuitry comprises circuitry for detecting a change in said power from the permanent power source and circuitry for enabling said temporary power source to provide said temporary power for said dying gasp transmission by said fiber optic output circuitry in response to said change in power.

4. The apparatus of claim 1 wherein said the permanent power source includes a power company and said power circuitry comprises circuitry for receiving said power from said power company.

5. The apparatus of claim 1 wherein said power circuitry comprises circuitry for receiving said power over telephone lines as supplied by a telephone company.

6. The apparatus of claim 1 wherein said dying gasp power source comprises a capacitor.

7. A telecommunications system coupled to a permanent power source, comprising:

a central office;

a plurality of feeder lines coupled to the central office;

a plurality of terminals coupled to respective feeder lines for splitting aggregated telecommunications services from said feeder lines into a plurality of distribution lines; and remote network units coupled to said distribution lines for interfacing between said lines and subscribers telecommunications equipment, said remote network units comprising:

power circuitry for receiving power from the permanent power source;

detection circuitry coupled to said power circuitry for detecting a loss of said power received by said power circuitry;

fiber optic output circuitry coupled to said power circuitry for receiving said power in order to output telecommunication signals on an optical fiber, said fiber optic output circuitry transmitting a message indicative of a shutdown of said fiber optic output circuitry due to a power failure in response to said loss of said power detected by said detection circuitry; and a temporary power source coupled to said fiber optic output circuitry for temporarily powering said output circuitry for a dying gasp transmission of said message in response to said loss of said power detected by said detection circuitry, said temporary power source having sufficient temporary power to enable said message to be transmitted at least once by said fiber optic output circuitry.

8. The telecommunications system of claim 7 wherein said distribution lines comprise optical fiber cables.

9. The telecommunications system of claim 7 wherein said feeder lines comprise optical fiber cables.

10. The telecoommunications system of claim 7 wherein said fiber optic output circuitry includes circuitry for receiving a control signal from said detection circuitry.

11. The telecommunications system of claim 7 wherein said detection circuitry comprises circuitry for detecting a change in power on said permanent power source and circuitry for enabling said temporary power source to temporarily power said fiber optic output circuitry in response to said change in power.

12. The telecommunications system of claim 7 wherein the permanent power source includes a power company, and said power circuitry comprises circuitry for receiving said power from said power company.

13. The telecommunications system of claim 7 wherein said power circuitry comprises circuitry for receiving said power over telephone lines as supplied by a telephone company.

14. The telecommunications system of claim 7 wherein said dying gasp power source comprises a capacitor.

15. A method of monitoring power loss in a remote optical network unit coupled to a telecommunications equipment of a subscriber, the optical network unit operating in a telecommunications system, comprising the steps of:

applying power to the optical network unit for transmitting telecommunications signals;

detecting a power loss to the optical network unit;

enabling a temporary power source having limited power in response to the power loss; and applying the limited power from the temporary power source to the optical network unit for a dying gasp transmission of a message indicating a shutdown of the optical network unit due to the power loss.

16. The method of claim 15 and further comprising the step of repeatedly transmitting the message until the dying gasp power source is depleted.

17. The method of claim 15 wherein said enabling step comprises the step of enabling a capacitor to supply said limited power responsive to said power loss.

18. The method of claim 15 and further comprising the step of receiving the power from the local power company.

19. The method of claim 15 and further comprising the step of receiving the power from the telephone company.

20. The method of claim 15 wherein said detection step includes the step of generating a control signal responsive to detecting the power loss.

21. The method of claim 20 wherein said transmitting step comprises the step of transmitting a message in response to receiving said control signal.

22. Apparatus for monitoring power supplied to a remote optical network unit operating in a telecommunications system using optical fibers, comprising:

detection circuitry coupled to said remote optical network unit for detecting a loss of power supplied thereto;

fiber optic output circuitry coupled to said detection circuitry for receiving power and transmitting a message on said optical fiber in response to said detection circuitry detecting said loss of power to said fiber optic output circuitry, said message indicative of a shutdown of said fiber optic output circuitry due to said loss of power; and a limited and rechargeable power source, including a capacitor, coupled to said fiber optic output circuitry for temporarily powering said fiber optic output circuitry for a dying gasp transmission of said message in response to said loss of power to said fiber optic output circuitry until said limited and rechargeable power source is depleted.

* * * * *